(12) United States Patent
Aufderheide et al.

(10) Patent No.: US 11,541,922 B2
(45) Date of Patent: Jan. 3, 2023

(54) METHOD FOR GENERATING AN IMAGE OF A ROUTE NETWORK, USE OF THE METHOD, COMPUTER PROGRAM, AND COMPUTER-READABLE STORAGE MEDIUM

(71) Applicant: SIEMENS MOBILITY GMBH, Munich (DE)

(72) Inventors: Helge Aufderheide, Munich (DE); Marco Fechtig, Uehlingen-Birkendorf (DE)

(73) Assignee: Siemens Mobility GmbH, Munich (DE)

( * ) Notice: Subject to any disclaimer, the term of this patent is extended or adjusted under 35 U.S.C. 154(b) by 432 days.

(21) Appl. No.: 16/627,442

(22) PCT Filed: May 14, 2018

(86) PCT No.: PCT/EP2018/062368
§ 371 (c)(1),
(2) Date: Dec. 30, 2019

(87) PCT Pub. No.: WO2019/001825
PCT Pub. Date: Jan. 3, 2019

(65) Prior Publication Data
US 2021/0146979 A1    May 20, 2021

(30) Foreign Application Priority Data

Jun. 30, 2017 (DE) ..................... 10 2017 211 120.8

(51) Int. Cl.
*B61L 25/02* (2006.01)
*G01C 21/00* (2006.01)
*B61L 27/40* (2022.01)

(52) U.S. Cl.
CPC ............. *B61L 25/025* (2013.01); *B61L 25/02* (2013.01); *B61L 27/40* (2022.01); *G01C 21/005* (2013.01)

(58) Field of Classification Search
CPC ........ B61L 25/025; B61L 25/02; B61L 27/40; G01C 21/005; G01C 21/32; G01C 21/30
See application file for complete search history.

(56) References Cited

U.S. PATENT DOCUMENTS 7,340,328 B2    3/2008  Matheson et al.
2006/0212184 A1  9/2006  Philp et al.
(Continued)

FOREIGN PATENT DOCUMENTS

AT    516553 A1 *  6/2016  ............ B61L 23/041
BR    PI0706960 A2   4/2011
CN    106326303 A    1/2017
(Continued)

*Primary Examiner* — Michael J Zanelli
(74) *Attorney, Agent, or Firm* — Laurence A. Greenberg; Werner H. Stemer; Ralph E. Locher

(57) ABSTRACT

A method for generating an image of a route network that is travelled through by a rail vehicle. The image is generated with the use of activities that are recorded by the rail vehicle as it travels through the route network and sorted in an activity sequence. In order to provide an improved method, patterns in the activity sequence are identified with use of a pattern detection method and the image of the route network is generated with the use of the identified patterns.

15 Claims, 1 Drawing Sheet

(56) References Cited

U.S. PATENT DOCUMENTS

2018/0190270 A1 7/2018 Chen
2019/0084599 A1* 3/2019 Pinto ................... B61L 25/021

FOREIGN PATENT DOCUMENTS

| DE | 102009021053 A1 | 11/2010 | |
|---|---|---|---|
| DE | 102012219111 A1 | 4/2014 | |
| DE | 102012107918 A1 | 5/2014 | |
| DE | 102015214425 A1 | 2/2017 | |
| JP | 2009063445 A | 3/2009 | |
| WO | WO-2018041672 A1 * | 3/2018 | .......... B61L 15/0072 |

* cited by examiner

METHOD FOR GENERATING AN IMAGE OF A ROUTE NETWORK, USE OF THE METHOD, COMPUTER PROGRAM, AND COMPUTER-READABLE STORAGE MEDIUM

BACKGROUND OF THE INVENTION

Field of the Invention

The invention relates to a method for generating an image of a route network that is travelled through by a rail vehicle.

At present, the route network that is travelled through by a rail vehicle is identified using a navigation satellite system (for example GPS) and/or using balises that are integrated into the routes. The rail vehicle is regularly provided with location information (from the navigation satellite system and/or the balises). Using the location information, the route network can be determined. For example, an image of the route network that is being travelled through can be generated using the location information.

In tunnels and/or in a tunnel system, a rail vehicle cannot connect to a satellite. In particular in the case of underground railways, for this reason the navigation satellite system cannot be used to determine the route network that is being travelled through.

If balises are integrated into routes, the balises send location information to the passing rail vehicle. The rail vehicle expects the respective location information of the respective balise at the appropriate locations. If a balise fails, this balise does not send location information. This can cause delays to the rail vehicle as the rail vehicle is waiting for location information.

SUMMARY OF THE INVENTION

It is an object of the invention to specify an improved method for determining a route network that is being travelled through by a rail vehicle.

The object is achieved by a method for generating an image of a route network that is being travelled through by a rail vehicle using activities that are recorded when the rail vehicle is travelling through the network and that are sorted into a sequence of activities, in which according to the invention patterns are recognized in the sequence of activities using a pattern recognition method and the image of the route network is generated using the recognized patterns.

Typically, activities of a rail vehicle are recorded while travelling through a rail network. The idea of the invention is to use these data to produce an image of the route network.

The invention offers the advantage that an image of the route network can be generated independently of balises and independently of a navigation satellite system. The existing infrastructure, such as balises and/or GPS satellites, as well as associated receivers, are not needed to produce the image of the route network. In this way, costs (acquisition costs, maintenance costs, data transmission costs, etc.) can be saved.

Appropriately, the route network is a rail network.

The activities can be sorted into the sequence of activities by the rail vehicle while travelling through the route network. In addition, the activities can be sorted into the sequence of activities by the rail vehicle after travelling through the route network.

It is preferred if the activities in the activity sequence are sorted according to a presettable criterion. That is, the activities sorted into the activity sequence can be sorted according to the presettable criterion. In particular, the activities in the sequence of activities may be or are sorted in time order.

Appropriately, at least one feature of the respective pattern is determined using the pattern recognition method for at least some of the recognized patterns. For example, a frequency, length and/or form of the respective pattern can be determined using the pattern recognition method for at least some of the recognized patterns. That is, that at least one feature of the respective pattern can be a frequency, a length and/or a form of the respective pattern. Appropriately, the image of the route network is produced using at least one feature of the respective pattern. In this way, the image of the route network can be generated using the recognized patterns and using at least one feature of the respective pattern.

Preferably, for at least some of the recognized patterns, the respective pattern is identified as a specific route section of the route network on the basis of the frequency, the length and/or the form thereof.

A frequency may be an absolute frequency, in particular a number, or a relative frequency, in particular a percentage. The number of activities in the respective pattern can be understood as a length of a particular pattern. The form of a pattern can be a symmetrical form for example, in particular a mirror-image form.

A pattern can be identified as a frequently recurring sequence of activities that includes a predetermined minimum number of activities. The frequently recurring sequence of activities, which includes a predetermined minimum number of activities, can be identified as the main route of the route network. A frequent sequence of activities can be a most frequent sequence of activities.

Furthermore, a frequent sequence of activities can be a sequence of activities with a predetermined minimum frequency.

A mirror image pattern that includes a specified minimum number of activities can be identified as a pattern. The mirror image pattern that includes a specified minimum number of activities can comprise a point of symmetry. Preferably, the point of symmetry is identified as a turning point within the route network.

If, using the pattern recognition method, a part of a sequence of activities is definitely assigned to a section of the route network that is already identified and a second part of the same sequence deviates from the already identified route section, the second part is appropriately identified as a branch from the identified route. It makes sense to recognize the branch as part of the route network.

In an advantageous embodiment of the invention, the activities in the sequence of activities are encoded by alphanumeric symbols. An alphanumeric symbol may be interpreted as a single alphanumeric character or a sequence of a plurality of alphanumeric characters.

The pattern recognition method may include, for example, a sequence matching algorithm, in particular a sequence alignment algorithm. The sequence alignment algorithm can be used in a similar way to a DNA analysis. In particular, the sequence alignment algorithm may include a free-shift alignment. Furthermore, the sequence alignment algorithm may be an algorithm that is in particular adapted to the creation of an image of a route network.

Appropriately, the pattern recognition method allows tolerances to a predetermined degree. In this way, already similar sequences of activities can be recognized as the same pattern. This means that the pattern recognition method can allow deviations to a predetermined extent, so that already similar sequences of activities are recognized as the same pattern. For example, two sequences of activities that behave relative to each other like an image and a mirror image can be recognized as the same pattern. Furthermore for example, two sequences of activities can be recognized as the same pattern if the two sequences differ by a predetermined measure in a maximum number of activities, especially in exactly one activity.

In particular, those events that are carried out by the rail vehicle or its components and that are accordingly different from passive events, such as the reception of external signals, such as GPS or balise signals, are interpreted as activities.

Appropriately, the activities of the rail vehicle include holding the rail vehicle. Furthermore, it is preferred if the activities of the rail vehicle include driving a route of a certain length.

Holding the rail vehicle may be holding without opening a door. Furthermore, holding the rail vehicle may be holding with opening a right side door of the rail vehicle. Furthermore, holding the rail vehicle may be holding with opening a left side door of the rail vehicle. In addition, holding the rail vehicle may be holding with opening of doors on both sides of the rail vehicle.

Appropriately, the image of a route network is generated automatically. In particular, the image of the route network may be produced fully automatically and/or semi-automatically, in particular using a computer program running on a computer. In the case of semi-automatic generation of the image, a partial step can be performed other than by the computer itself, for example by the action of a person. In the case of fully automatic generation of the image, the image can be generated without the manual action of a person.

The invention also concerns a use of the aforementioned method for locating the rail vehicle at a predetermined time. When using the method, a further sequence of activities of the rail vehicle, which appropriately comprises a certain number of activities around the specified time, is compared with the generated image of the route network. The comparison allows the rail vehicle to be assigned to a specific section of the route network. In this way, the rail vehicle can be located.

The further sequence of activities is appropriately a different sequence of activities from the first-mentioned sequence of activities used to produce the image of the network. Preferably, the further sequence of activities includes activities recorded and sorted when travelling through the route network with the rail vehicle. In the further sequence of activities, the activities are appropriately sorted according to the same criterion as in the first-mentioned sequence of activities.

The advantage is that the rail vehicle can be located at the specified time, such as at a time of an event or incident, without GPS data and without location information transmitted by balises. For example, in this way, a defect of a balise can also be detected.

Conveniently, the localization of the rail vehicle is carried out automatically. In particular, the localization of the rail vehicle can be carried out fully automatically and/or partially automatically, in particular using a computer program executed on a computer.

Furthermore, the invention concerns a computer program with commands which, when the computer program is executed on a computer, cause the computer to perform the aforementioned method.

Furthermore, the invention concerns a computer-readable storage medium with commands which, when executed by a computer, cause that computer to perform the aforementioned method.

The previously given description of advantageous embodiments of the invention contains numerous features that are partially reproduced in the individual subordinate claims in combinations of several features. However, these features can also be considered individually and combined into meaningful further combinations. In particular, these features may each be combined individually and in any suitable combination with the method according to the invention, the computer program according to the invention and the computer-readable storage medium according to the invention. Thus, features of the method are also to be viewed as being objectively formulated as a property of the computer program and/or the computer-readable storage medium and vice versa.

Even where some terms are used in the singular or in conjunction with a numeral in the description or in the claims, the scope of the invention shall not be limited to the singular or the respective numeral for these terms.

The above-described characteristics, features and advantages of this invention, as well as the way in which these are achieved, become clearer and more precise in the context of the following description of the exemplary embodiments, which are described in more detail in connection with the drawings. The exemplary embodiments are used to explain the invention and do not limit the invention to the combination of features specified therein, including in relation to functional features. In addition, suitable features of each embodiment may also be considered explicitly in isolation, may be removed from an embodiment, may be introduced into another embodiment to add thereto and may be combined with any of the claims.

DESCRIPTION OF THE INVENTION

Figure 1:
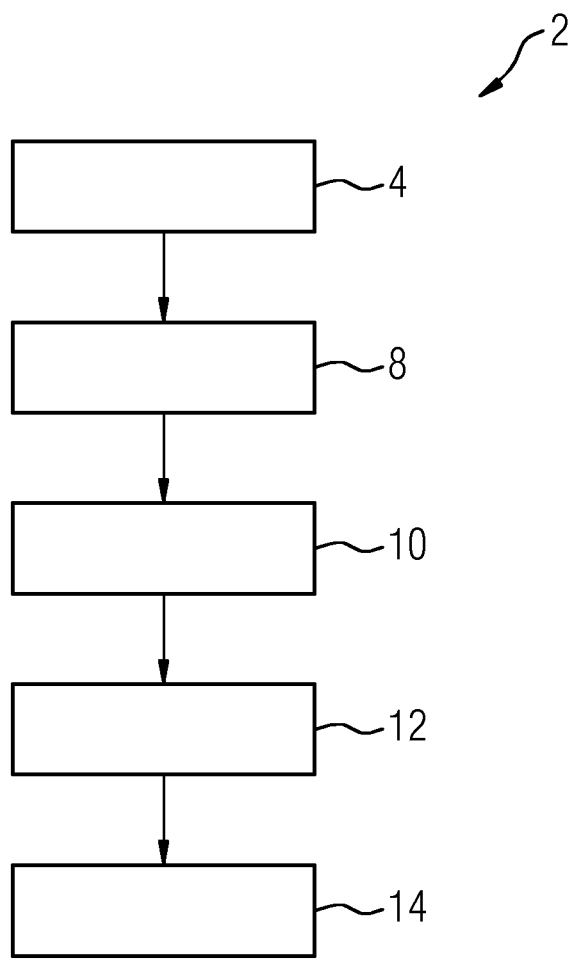
FIG. 1 shows a flowchart of a method for creating an image of a route network and FIG. 2 shows a flowchart of the use of the method from FIG. 1 for locating the rail vehicle at a given time.

FIG. 1 shows a flowchart 2 that illustrates a method for creating an image of a route network. The route network is being travelled through by a rail vehicle. When travelling through the route network, the activities that are recorded by the rail vehicle are sorted into a sequence of activities 4. The activities are sorted into the sequence of activities 4 by time. In addition, the activities in the sequence of activities 4 will be encoded by alphanumeric symbols.

For example, a sequence of activities 4 might be as follows:
05-R-03-L-02-B-10-R-10-B-02-L-03-R-05-X-05-R-03-L-02-B-07-L-11-B-01-X In this example, the activities include driving a route of a certain length, which is encoded here, for example, by a two-digit number. The number corresponds to the rounded length of the route in kilometers. A different alphanumeric encoding would also be possible.

Further, in this example, the activities include holding the rail vehicle, which is encoded by a letter in this example. In this example, holding without opening the door is encoded by an "X", holding with opening a door on the right of the rail vehicle is encoded by an "R", holding with opening a door on the left of the rail vehicle is encoded by an "L" and holding with opening of doors on both sides of the rail vehicle is encoded by a "B".

Using a pattern recognition method, patterns 8 in the activity sequence 4 are recognized. The pattern recognition method allows tolerances to a predetermined degree. For example, two sequences of activities that behave like an image and a mirror image relative to each other are recognized as the same pattern. This means that the reading direction in the activity sequence 4 does not matter. For example, the sequence of activities 05-R-03-L-02-B-10 and the sequence of activities 10-B-02-L-03-R-05 are recognized as the same pattern.

In addition, using the pattern recognition method, for at least some of the recognized patterns 8 at least one characteristic 10 of the respective pattern 8 is determined, namely a frequency, a length and/or a form of the respective pattern 8. The frequency is an absolute frequency. A length is a number of activities of the respective pattern.

Detected patterns 8 and identified features 10 thereof may be as follows, for example:

| Pattern | Length | Frequency | Form |
|---|---|---|---|
| 05-R-03-L-02-B-10-R-10-B-02-L-03-R-05 | 15 | 1 | Mirror image |
| B-02-L-03-R-05-X-05-R-03-L-02-B | 13 | 1 | Mirror image |
| 05-R-03-L-02-B-10 | 7 | 2 | |
| 05-R-03-L-02 | 5 | 3 | |
| ... | | | |

The pattern recognition method allows tolerances to a predetermined extent. In this way, similar sequences of activities, also referred to as sequences below, are recognized as the same pattern. For example, two sequences of activities are recognized as the same pattern when the two sequences differ in exactly one activity to a predetermined extent. In particular, a deviation of a length of a travel distance of 1 km may be allowed for recognizing two sequences as the same pattern, for example to take into account rounding errors. In this example, a deviation of a number by ±1 can be allowed in order to recognize two sequences as the same pattern. Furthermore, a deviation of a type of hold may be allowed in order to recognize two sequences as the same pattern. In this example, a change of a letter may be allowed in order to recognize two sequences as the same pattern.

Furthermore, for example, two sequences of activities are recognized as the same pattern when exactly one activity is exchanged for three activities according to a given rule. For example, in order to identify two sequences as the same pattern, a stopover may be allowed, wherein the sum of the distances directly before and after the stopover is the same as the distance without a stopover. In this example, it may be allowed if a first number is exchanged for two numbers and a letter, wherein the sum of the two numbers gives the first number, in order to recognize two sequences as the same pattern. For example, a sequence that includes a 10 and another sequence that includes the sequence 04-X-06 or the sequence 03-R-07 or similar instead of the 10 can be recognized as the same pattern.

For at some of the recognized patterns 8, the respective pattern 8 is identified as a specific section 12 of the route network by the features 10 thereof, in particular by the frequency, the length and/or the form thereof.

A frequently recurring sequence of activities that includes a predetermined minimum number of activities is recognized as a pattern. This frequently recurring sequence of activities that includes a predetermined minimum number of activities can be identified as a main route of the route network.

In this example the mirror-image forms are not considered for identifying the main route. Of the other two longest recognized patterns, the most frequent pattern is identified as a main route of the network. In this way, the pattern 05-R-03-L-02 can be identified as the main route. The main route is shown in italics below.

A mirror-image pattern that contains a predetermined minimum number of activities is also recognized as a pattern. A point of symmetry of the mirror image pattern is determined. The point of symmetry is identified as a turning point within the route network.

For example, in this case the pattern 05-R-03-L-02-B-10-R-10-B-02-L-03-R-05 is recognized as a mirror image pattern. The point of symmetry of the mirror image pattern lies in the middle of the mirror image pattern and is highlighted here in bold and underlined.

This point of symmetry is identified as the turning point within the route network.

In this example, the following route is thus identified: 05-R-03-L-02-B-10-R.

The pattern recognition method further recognizes that the latter route includes the main route. 05-R-03-L-02-B-10-R is thereby recognized as a route section.

Furthermore, for example, the pattern B-02-L-03-R-05-X-05-R-03-L-02-B is recognized as a mirror image pattern. The point of symmetry of the mirror image pattern lies in the middle of the mirror image pattern and is highlighted here in bold and underlined. This point of symmetry is identified as the turning point within the route network. The pattern recognition method further recognizes that the latter route includes the main route. X-05-R-03-L-02-B-10-R is thereby recognized as a route section.

If, using the pattern recognition method, a part of a sequence of activities is positively assigned to an already identified section of the route network and a second part of the same sequence deviates from the already identified section of the route, the second part is detected as a branch from the identified section of the route.

Previously unassignable sequences can then be inserted gradually into the (partially) generated route network using a sequence alignment algorithm, in particular a free shift alignment.

For example, in this example, the sequence 07-L-11-B-01-X could not be assigned. For free shift alignment, a longer sequence is taken that contains the unassigned sequence, and it is determined where the longer sequence matches.

In this example, the sequence R-03-L-02-B-07-L-11-B-01-X is compared with the already identified route section X-05-R-03-L-02-B-10-R.

The comparison of
R-03-L-02-B-07-L-11-B-01-X with
X-05-R-03-L-02-B-10-R
provides that the first part, namely R-03-L-02-B, of the (longer) sequence can definitely be assigned to an already identified section of the route network, and the second part 07-L-11-B-01-X of the same sequence deviates from the already identified section of the route. Thus, the second part 07-L-11-B-01-X is recognized as a branch from the identified section of the route.

Using at least one feature 10 of the respective pattern 8 and possibly using a sequence alignment algorithm, the image 14 of the route network can be generated. In this way, the image 14 of the route network can be generated using the recognized patterns.

In this example, the image 14 is as follows:

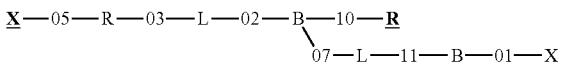

Where appropriate, the generated image 14 of the route network may be compared to a topographical map. Based on this comparison, place names or station names can be assigned to the holding of the rail vehicle in the image, which are encoded here by letters.

Figure 2:
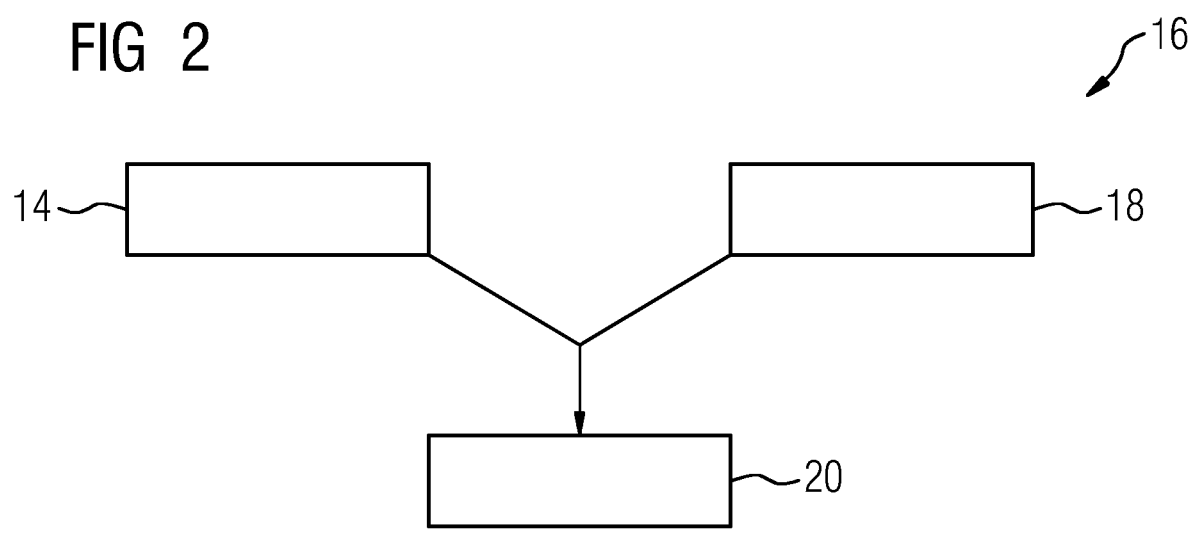

FIG. 2 shows a flowchart 16 regarding the use of the method from FIG. 1 to locate 20 the rail vehicle at a given time.

A sequence of activities 18 (other than that referred to in FIG. 1) of the rail vehicle, which comprises a certain number of activities at the specified time, is compared with the image 14 of the route network shown in FIG. 1. On the basis of the comparison, the rail vehicle is assigned to a specific section of the route network ("localization 20" of the rail vehicle).

In this example, the latter sequence of activities 18 is as follows:

B-11-L-07

For example, during the last activity "07", namely when driving a distance of 7 km, an incident has occurred, and it is to be determined where this incident took place. The individual activity at the time of the incident is not sufficient to locate the rail vehicle at the time of the incident. However, if the latter sequence of activities 18 of the rail vehicle, which comprises a certain number of activities at the specified time, is compared with the image 14 of the route network produced in FIG. 1, the rail vehicle may be located ("localization 20") in that by using the comparison the rail vehicle is assigned to a specific section of the route network.

When comparing the latter sequence of activities 18:

B-11-L-07 with the generated image 14:

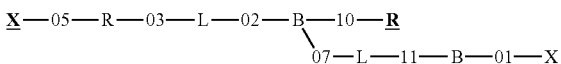

it is determined that the rail vehicle was travelling through the branch at the time of the incident and at the time of the incident is travelling on the first section "07" of the branch. The direction of the rail vehicle can also be determined using the comparison.

Although the invention has been illustrated and described in detail by the preferred exemplary embodiments, the invention is not limited by the disclosed examples and other variations can be derived from this by the person skilled in the art without departing from the scope of protection of the invention.

The invention claimed is:

1. A method for generating an image of a route network, the method comprising:

recording activities as a rail vehicle is travelling through the route network and sorting the activities into a sequence of activities;

the activities of the rail vehicle including holding the rail vehicle and driving a distance of a certain length;

recognizing patterns in the sequence of activities by way of a pattern recognition method; and producing the image of the network using the recognized patterns.

2. The method according to claim 1, which comprises sorting the activities in the activity sequence according to a pre-set criterion.

3. The method according to claim 2, which comprises sorting the activities in the activity sequence by time.

4. The method according to claim 1, which comprises:

using the pattern recognition method for at least some of the recognized patterns, determining at least one feature of the respective pattern selected from the group consisting of a frequency, a length, and a form of the respective pattern; and using at least one feature of the respective pattern for generating the image of the route network.

5. The method according to claim 1, which comprises, for at least some of the recognized patterns, identifying the respective pattern as a certain section of the route network by at least one feature selected from the group consisting of a frequency, a length, and a form of the pattern.

6. The method according to claim 1, which comprises recognizing a frequently recurring sequence of activities comprising a predetermined minimum number of activities as a pattern and identifying as a main route of the route network.

7. The method according to claim 1, wherein a mirror image pattern that includes a predetermined minimum number of activities with a point of symmetry is recognized as a pattern and the point of symmetry is identified as a turning point within the route network.

8. The method according to claim 1, which comprises, if a part of a sequence of activities is definitely assigned to a previously identified section of the route network using the pattern recognition method, and a second part of the same sequence deviates from the already identified section, determining the second part as a branch from the identified route.

9. The method according to claim 1, which comprises encoding the activities in the sequence of activities by alphanumeric symbols.

10. The method according to claim 1, wherein the pattern recognition method includes a sequence matching algorithm.

11. The method according to claim 10, wherein the pattern recognition method includes a sequence alignment algorithm.

12. The method according to claim 1, wherein the pattern recognition method allows tolerances to a predetermined degree, so that similar sequences of activities can be recognized as the same pattern.

13. The method according to claim 1, wherein the activity of holding the rail vehicle is an activity selected from the group consisting of holding without opening a door, holding with opening a door on the right side of the rail vehicle, holding with opening a door on the left side of the rail vehicle, and holding with opening doors on both sides of the rail vehicle.

14. A method of locating a rail vehicle, the method comprising:

implementing the method according to claim 1 for a localization of the rail vehicle at a predetermined time;

comparing a further sequence of activities of the rail vehicle that includes a certain number of activities at a specified time with the image of the network previously generated; and assigning the rail vehicle to a specific section of the route network based on the comparison.

15. A computer-readable storage medium having stored thereon commands in non-transitory form which, when run by a computer, cause that computer to perform the method according to claim 1.

* * * * *